United States Patent [19]

Ivey et al.

[11] 4,059,365
[45] Nov. 22, 1977

[54] SHEET METAL HUB ASSEMBLY

[75] Inventors: John Saxon Ivey, Bloomfield Hills, Mich.; Kenneth Albert Braybrook, Letchworth, England

[73] Assignee: Borg-Warner Corporation, Chicago, Ill.

[21] Appl. No.: 683,125

[22] Filed: May 4, 1976

Related U.S. Application Data

[62] Division of Ser. No. 598,441, July 23, 1975, Pat. No. 3,981,068.

[51] Int. Cl.² .................................................. F04D 29/04
[52] U.S. Cl. ................................... 416/174; 416/180; 416/224; 416/DIG. 3
[58] Field of Search ............... 416/180, 174, DIG. 3, 416/224, 197 C; 29/156.8 FC, 523

[56] References Cited

U.S. PATENT DOCUMENTS

| 2,351,517 | 6/1944  | Jandasek       | 416/180     |
| 2,843,311 | 7/1958  | Buchi          | 416/174 X   |
| 3,040,663 | 6/1962  | Cushing        | 416/174 X   |
| 3,316,622 | 5/1967  | Jandasek       | 29/156.8 FC |
| 3,386,244 | 6/1968  | Helmer         | 416/180 X   |
| 3,545,883 | 12/1970 | Iijima         | 416/180 X   |
| 3,750,267 | 8/1973  | Otto           | 29/523 X    |
| 3,786,555 | 1/1974  | Robertson et al. | 29/523 X  |
| 3,894,331 | 7/1975  | Ragettli       | 29/523 X    |
| 3,981,068 | 9/1976  | Ivey et al.    | 29/523      |

FOREIGN PATENT DOCUMENTS

| 1,185,249 | 7/1959 | France         | 416/180     |
| 453,626   | 9/1936 | United Kingdom | 416/DIG. 3  |

Primary Examiner—Everette A. Powell, Jr.
Attorney, Agent, or Firm—Robert L. Zieg

[57] ABSTRACT

A method of manufacturing a hydraulic torque converter impeller member and the product of such manufacture in which a hardened steel cylindrical bearing is assembled to a drawn hub portion of a generally annular sheet metal part to comprise a torque converter impeller comprising the steps of (1) semidrawing the part to include a partly drawn hub portion, (2) placing a hardened cylindrical bearing in a die mechanism, (3) assembling the generally annular part into the die mechanism with the hub portion engaged in the cylindrical bearing (4) drawing and extruding the hub by moving an object the size of the desired finished inside diameter of the hub through same whereby the hub is formed and forced against the bearing member with sufficient force to make a permanent connection between the hub and bearing, and (5) trimming the excess material from the outer end of the hub portion to conform same to the dimensions of the cylindrical bearing.

1 Claim, 4 Drawing Figures

SHEET METAL HUB ASSEMBLY

This is a division of application Ser. No. 598,441 filed July 23, 1975, now U.S. Pat. No. 3,981,068 issued Sept. 21, 1976.

SUMMARY OF THE INVENTION

It has been known for sometime that one of the most economical ways to manufacture component parts for a hydraulic torque converter is to manufacture same from sheet metal rather than from die castings or otherwise. The problem which presents itself when manufacturing the impeller member of a hydraulic torque converter from sheet metal and particularly when the hub portion of the impeller member, which includes both a bearing support and drive mechanism for a fluid pump, is formed from the sheet metal of the impeller member, is that the hub has poor bearing characteristics and that it is expensive and extremely difficult to provide a hardened surface on the sheet metal hub suitable for bearing purposes. The present invention provides a product comprising an impeller member with a unitary hub portion thereon out of sheet metal which includes a thin cylindrical hardened steel bearing assembled to the sheet metal hub portion. The assembly of the cylindrical bearing to the hub portion is by a unique drawing and extruding process comprising placing the bearing in a die, assembling the partly finished sheet metal impeller member in the die with the hub portion thereof in partly finished form engaged within the bearing, and passing a hardened steel or carbide ball through the center of the hub portion thereby drawing and extruding the hub through the cylindrical bearing to permanently connect or assemble the bearing to the hub portion. In this manner in a relatively inexpensive way, a proper bearing surface is provided on the sheet metal hub of the torque converter impeller member.

DESCRIPTION OF THE DRAWINGS

Referring to FIG. 1, an impeller member 10 is illustrated which comprises a generally annular member 12 made of sheet metal having a hub portion 14 thereon. A plurality of sheet metal blades 16 are secured within the impeller member 10 as is known in the prior art to provide for the pumping of fluid within a hydraulic torque converter of which impeller 10 is a component part. For a more complete description of a torque converter of this nature reference may be had to U.S. Pat. Nos. 2,717,673 and 2,855,852 of common assignee.

Figure 1:
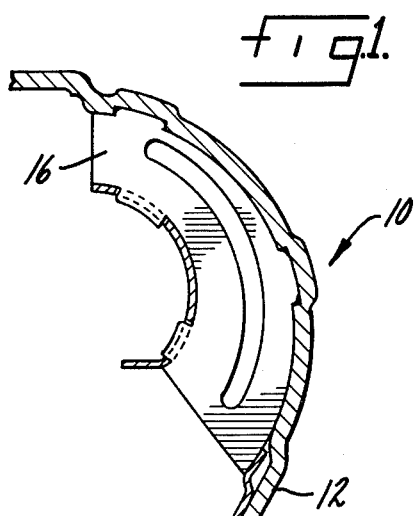
FIG. 1 is a sectional view through an impeller member of a hydraulic torque converter showing the hub assembly of the present invention.

The hub portion 14 has a hardened cylindrical bearing 18 thereon which is adapted to provide a wear surface for rotation of the impeller 10 in a transmission mechanism. A pair of drive slots 20 are provided through the bearing 18 and the hub 14 to receive drive tangs 22 which are part of a fluid pump mechanism whereby when the impeller 10 is rotated in use in an automatic transmission mechanism the hub portion 14 thereof will drive the pump member 22 to pump fluid pressure in response to driving of the engine.

Figure 2:
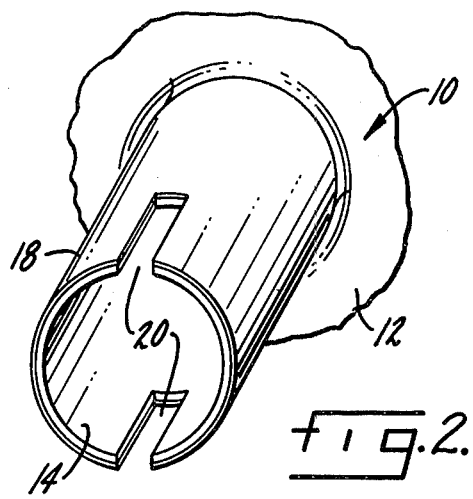
FIG. 2 is a perspective view of the hub portion of the impeller of FIG. 1.

FIG. 2 is a perspective view illustrating the hub portion 14 of impeller member 10 and in particular illustrating the drive slots 20 which are formed on opposite sides of hub portion 14 through both the sheet metal hub portion 14 and the bearing 18.

The bearing 18 is secured to the sheet metal annular impeller 10 by the unique process described herein which incorporates both drawing and extruding of the hub portion 14 to make the assembly.

Figure 3:
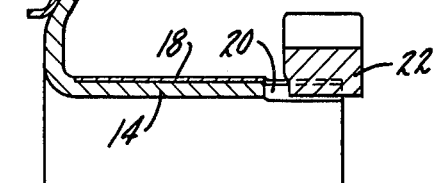
FIGS. 3 and 4 are partial sectional illustrations of the forming steps in securing the bearing member to the hub portion.
Figure 3:
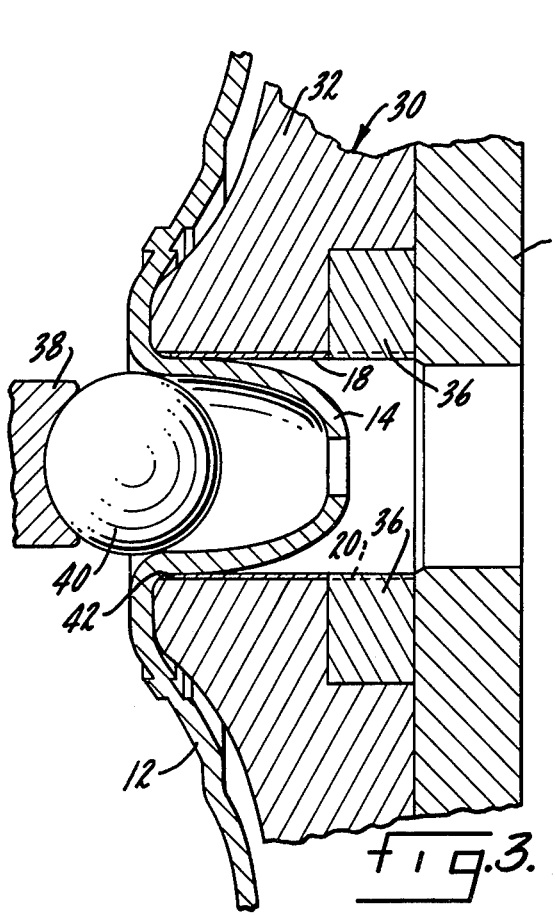
Figure 4:
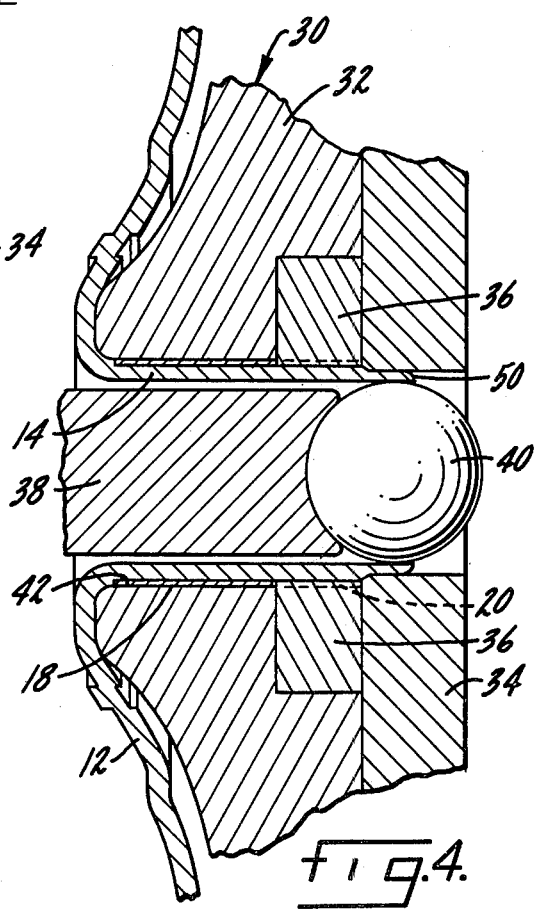

Referring to FIGS. 3 and 4 there is illustrated a die mechanism 30 which includes a support member 32 adapted to receive the member 12 therein in semifinished form. The die mechanism 30 includes a base support member 34 and bushing locaters 36. A punch member 38 is illustrated in FIG. 3 in position above the die mechanism 30 and carries a hardened steel or carbide extruder ball 40. As illustrated in FIG. 3, in the manufacturing process of the assembly the member 12 is placed in the die member 30 in semifinished form in that the hub portion 14 is not completely finished but is in a substantially conical or tapered form. Received within a bore 42 in the support member 32 is the hardened thin-wall cylindrical steel bearing 18 which is to be assembled to hub portion 14. Bearing 18 has preformed therein the slots 20 which are engaged by the locaters 36 to locate the hardened bearing within the die member.

The unique manufacturing method of the present invention thus comprises the following steps: (1) the generally annular sheet metal member 12 is preformed to the semifinished form illustrated in FIG. 3, (2) the cylindrical bearing member 18 is manufactured including slots 20 therein and is assembled in the die member 32 with the notches engaging locaters 36, (3) the member 12 is then assembled in the die with the semifinished hub portion 14 thereof being received within the internal diameter of the cylindrical bearing 18, (4) a hardened steel or carbide ball 40 is moved through the internal diameter of the hub portion 14 to finish drawing the hub portion 14 while at the same time extruding the hub portion 14 into the hardened cylindrical bearing 18, (5) the outer most extending portion 50 of hub portion is then cut or trimmed off to match the length of bearing 18, and (6) the slots 20 are then punched or cut to match the drive slots 20 in bearing 18.

It should be noted that the trimming and cutting operations of steps (5) and (6) above are not illustrated in the drawing since such steps are well known in the art and a variety of mechanisms can be utilized to carry out such steps.

It will be seen that in comparing the section thickness of hub portion 14 in FIGS. 3 and 4, not only is the hub portion 14 drawn to the desired final shape, but in the process thereof the hub portion 14 is extruded in that the section, as illustrated in FIG. 4, is thinner than that illustrated in FIG. 3 and in addition during the extruding process the hub portion 14 is expanded into extremely tight engagement with the hardened cylindrical bearing 18 forming a permanent assembly therewith. If desired, a knurled surface can be provided on the internal diameter of the hardened cylindrical bearing 18 which will enhance the securing of the bearing on the hub portion 14. Of course, by sizing the ball 40 to the proper dimension, the exact internal diameter of the hub portion 14 is determined without any further forming operations.

The product of the above unique method of manufacture is an improved sheet metal impeller for a hydraulic torque converter with a hub that is drawn and extruded to size and having assembled thereto a thin walled hard cylindrical bearing and including drive slots 20 formed on the end thereof to conveniently be engaged by mating tangs 22 of a pump mechanism for pumping fluid by means of the impeller member 10. Thus, an impeller 10 can be manufactured from sheet metal to provide economy of manufacture while at the same time the hub portion of the completed impeller has a wear resistant surface.

It should be noted that the slots 20 can be formed in the bearing 18 and hub 14 after assembly by known metal cutting techniques. In addition, as used in some transmissions, the pump drive is by flat surfaces formed on the hub and engaging in a mating configuration in the pump drive member. If such is the case, the present invention can still be utilized to extrude the hub 14 into the shape of bearing 18 if same has flat sections formed in the end thereof rather than slats.

Various of the features of the invention have been particularly shown and described, however, it should be obvious to one skilled in the art that modifications may be made therein without departing from the scope of the invention.

We claim:

1. An impeller assembly for a hydraulic torque converter constructed of sheet metal and having an axially extending hollow hub portion integral therewith adapted to be connected to drive a fluid pump, the hub member having a thin wall cylindrical bearing member thereon, the bearing member being secured to the hub portion so as to rotate therewith by extrusion of the hub through said bearing, said bearing member providing a wear resistant surface on the sheet metal hub surface.

* * * * *